United States Patent [19]
Suzuki

[11] 3,797,619
[45] Mar. 19, 1974

[54] OPERATIONAL CONTROL SYSTEM FOR VEHICLE STEERING CLUTCHES AND BRAKES

[75] Inventor: Yasuo Suzuki, Komatsu, Japan

[73] Assignee: Kabushiki Kaisha Komatsu Seisakusho, Tokyo-to, Japan

[22] Filed: Oct. 2, 1972

[21] Appl. No.: 293,912

[52] U.S. Cl............... 192/13 R, 180/6.7, 64/DIG. 2
[51] Int. Cl............................................ F16d 67/02
[58] Field of Search............. 192/13 R; 180/6.7, 6.2

[56] References Cited
UNITED STATES PATENTS

| | | | |
|---|---|---|---|
| 1,572,943 | 2/1926 | McKinley | 192/13 R |
| 1,317,656 | 9/1919 | Turnbull | 192/13 R |
| 2,698,667 | 1/1955 | Kropp | 180/6.7 X |
| 3,262,525 | 7/1966 | Ehlke et al. | 192/13 R |

Primary Examiner—Benjamin W. Wyche
Attorney, Agent, or Firm—Fitzpatrick, Cella, Harper & Scinto

[57] ABSTRACT

Left and right steering clutches of a vehicle are released and corresponding brakes are then applied by respective linkages respectively actuated by left and right steering levers, and a third linkage including a force equalizer and actuated by a single brake pedal applies equal braking force simultaneously to the left and right brakes independently of the operation of the steering clutches.

1 Claim, 2 Drawing Figures

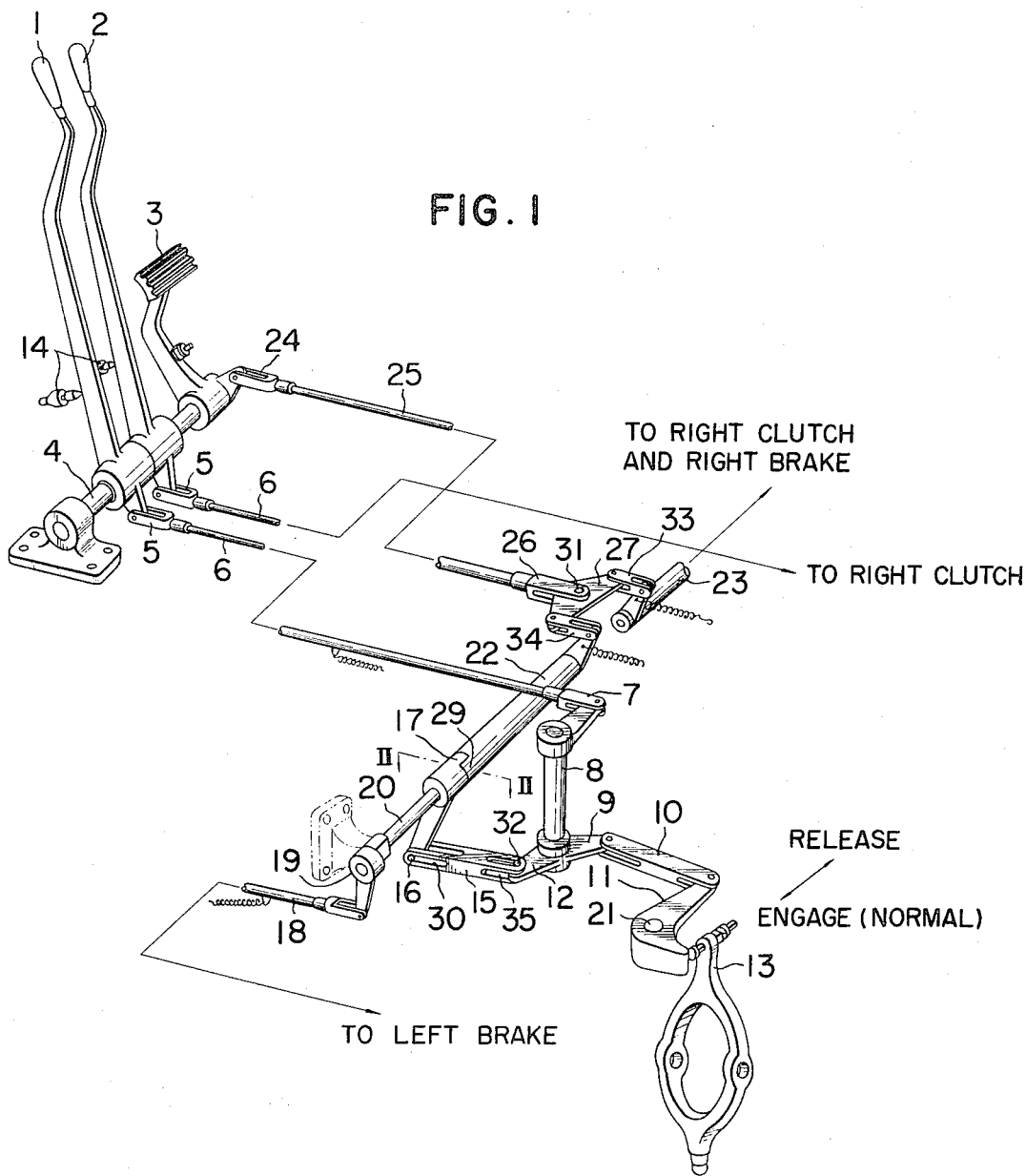
FIG. 1
FIG. 2
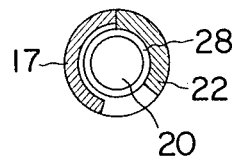

OPERATIONAL CONTROL SYSTEM FOR VEHICLE STEERING CLUTCHES AND BRAKES

BACKGROUND

This invention relates generally to operational control of vehicles, particularly those of the class which can be steered by independent driving and/or braking.

More specifically, the invention relates to an operational control system adapted for operating in a vehicle having left and right steering clutches and brakes, in one mode, to interlock the actions of the steering clutches and the brakes and, in another mode, to actuate simultaneously the left and right brakes without interlocked action of the brakes and clutches.

In a conventional tractor of the type in which steering clutches and brakes have interlocked actions, pulling rearward one of two left and right steering levers releases the steering clutch on the side of that lever thus pulled, and then, as that same lever is pulled further, the brake on that side operates, whereby the tractor turns toward that side. Accordingly, by pulling simultaneously the two steering levers, the tractor can be stopped.

However, since each brake operates after the steering clutch is released, there is an interval after the driving wheels or driving sprockets have become free to rotate in which the tractor tends to continue running under momentum, whereby the operator cannot stop the tractor at an expected point.

Furthermore, the left and right braking actions are not uniformly equal, there being differences such as differences between the speeds at which the two levers are pulled, between the forces with which they are pulled, and between the instants at which the brakes on the two sides start to operate. Consequently, there is a dangerous tendency of the tractor under such braking conditions to swerve toward either side in an unpredictable manner. As one measure for eliminating these dangerous tendencies, a tractor steering clutch brake system wherein braking action is caused on only one side by a single pedal which does not undergo interlocked movement with the clutch has been proposed.

In this proposed system, since the brake device on only one side is caused to perform braking, the wear of the brake lining of the brake device on that side is hastened, whereby the difference in wear of the left and right brake linings becomes considerably great. The difference in wear is further aggravated under conditions requiring a large braking force such as braking on inclined ground. Consequently, a difference develops in the strokes of the left and right steering levers from clutch release to brake application, whereby continual and troublesome stroke adjustment is necessary.

SUMMARY

It is an object of this invention to overcome the above described difficulties heretofore encountered in operational control systems of vehicles of the instant class by providing an operational control system for steering clutches and brakes of a vehicle in which system, in addition to the operation of the left and right steering clutches and brakes through respective linkages actuated by left and right steering levers, the left and right brake devices can be operated simultaneously by the depressing of a single pedal, and, moveover, equal braking force is applied on the left and right sides of the vehicle irrespective of the difference in wear of the brake linings on the two sides due to the difference in the frequencies with which the vehicle is steered in left and right turns.

According to this invention, briefly summarized, there is provided, in a vehicle of the character referred to above, an operation control system comprising: left and right steering levers; left and right linkages respectively for releasing the left and right steering clutches and then applying the left and right brakes when actuated respectively by the left and right steering levers; a brake pedal; third linkage for applying equal braking force simultaneously to the left and right brakes when actuated by the pedal; and means for transmitting said equal braking force to operate the left and right brakes independently of the operation of steering clutches.

The nature, principal, and utility of the invention will be apparent from the following detailed description with respect to a preferred embodiment of the invention when read in conjunction with the accompanying drawing.

DRAWING

In the drawing:

FIG. 1 is a perspective view, partly broken away, showing the essential parts of one example of a control system according to this invention; and FIG. 2 is a sectional view taken in the plane indicated by line II—II in FIG. 1.

DETAILED DESCRIPTION

Referring to FIG. 1, the control system illustrated therein is operated by two steering levers 1 and 2 and a brake pedal 3, which are disposed at the operator's station at positions suitable for manual and foot operation thereof by the operator. The steering lever 1 is pivotally supported at its lower end on a transverse shaft 4 and has a downwardly extending lever arm coupled by way of a connecting rod 6 provided with clevises 5 and 7 at its ends to an arm fixed to one end of a vertical crank shaft 8. Accordingly, manipulation of the steering lever 1 in the forward and rearward directions causes the crank shaft 8 to rotate in the clockwise and counterclockwise directions, respectively, as viewed from above.

A lever arm 9 fixed to the other end of the crank shaft 8 is coupled by way of a link 10 to one arm of a bellcrank 11 pivotally supported by a vertical pin 21. The other arm of the bellcrank 21 is in contact with one end of a yoke lever 13, which is a part of a clutch (not shown) of the spring-pressed type. When the steering lever 1 is pulled rearward, the movement thereof is transmitted through the above described mechanism to release the clutch.

Another arm 12 is formed integrally with the lever arm 9 and is thereby fixed to the crank shaft 8. Accordingly, this arm 12 swings in concert with the clutch release operation and, pulling a link 15 connected thereto by a pin 32, causes a clutch interlocking lever 17 connected to the link 15 by a pin 16 to rotate. The proximal end of this clutch interlocking lever 17 is fixed to a transverse shaft 20 fixedly supporting at an end thereof a brake actuating lever 19. The distal end of this lever 19 is pin connected to a brake rod 18 for the left brake. Accordingly, when the clutch interlocking lever 17 rotates, the brake actuating lever 19 also rotates to pull the brake rod 18 and thereby to operate the left brake device (not shown).

In the operation of the above described mechanism, a delay interval is created between clutch release and brake application by the link mechanism including the link 15. More specifically, the lever arm 12 is connected to the link 15 by a pin 32 fixed to the distal end of the lever arm 12 and slidably engaged in a slot 35 formed at one end part of the link 15 in the longitudinal direction thereof. The pin 32 is normally disposed at an intermediate position between the two ends of the slot 35.

During the clutch-release operation of the yoke 13, this pin 32 slides along the slot 35, imparting no pulling force to the link 15, until it contacts the outer end of the slot 35 after the clutch-release operation has been completed. The rotation of the lever arm 12 is thereupon transmitted through the link 15 to rotate the clutch interlocking lever 17.

The steering clutch lever 1 is returned in the following manner to its normal position. The yoke 13 is pushed back by the force of the clutch spring (not shown), which has been under strain, whereby the linkage mechanism between the yoke 13 and the steering clutch lever 1 is caused to undergo movements in directions opposite those in the clutch-release operation, and the lever 1 is returned until it is stopped by a stop 14, which sets the most forward position of the lever 1.

While the interlocked steering clutch and brake control system has been described above with respect to the mechanism thereof on the left side under control through the left-steering lever 1, it is to be understood that the mechanism on the right side under control through the right steering lever 2 is exactly alike except that it is disposed symmetrically opposite relative to the left-side mechanism. Accordingly, detailed description of the right-side mechanism will be omitted.

The left and right brake devices, only, can be operated simultaneously without interlocked action with the release of the left and right steering clutches in the following manner. The aforementioned brake pedal 3 is also rotatably supported on the transverse shaft 4 and is coupled by way of a connecting rod 25 provided at its two ends with clevises 24 and 26 to an equalizer 27 by a pin 31. The equalizer 27, which is free to swing about the pin 31 as a pivot, is connected at its ends by links 33 and 34 to the outer ends of lever arms extending perpendicularly outward from transverse torque tubes 23 and 22 supported rotatably and coaxially on the same axis as the aforementioned transverse shaft 20 and functioning to transmit braking torque to the right and left brake devices.

The torque tubes 22 and 23 are rotatably supported by needle bearings 28 on the shaft 20 as indicated in FIG. 2. The outer end of the torque tube 22 can be coupled by a cutout clutch 29 with the aforementioned clutch interlocking lever 17. That is, when the torque tube 22 is rotated by the depression of the brake pedal 3, a stepped part of the output clutch 29 on the torque tube side engages with a corresponding stepped part on the side of the lever 17 and thereby rotates the lever 17 in the direction for operating the left brake device.

On the other hand, when the clutch interlocking lever 17 is rotated in the aforedescribed operation of clutch release and brake application, only the lever 17 rotates and does not actuate the torque tube 22 in rotation. The above description is applicable also to the right mechanism of the torque tube 23 and its corresponding right clutch interlocking lever (not shown).

Accordingly, when the brake pedal 3 is stepped on and depressed, and the equalizer 27 is pulled forward, this movement is transmitted through the links 34 and 33 to rotate the left and right torque tubes 22 and 23, whereby the cutout clutches 29 function to rotate the left and right clutch interlocking levers 17 and thereby to apply simultaneously the left and right brakes.

That is, since each clutch interlocking lever 17 and the corresponding brake actuating lever 19 are fixedly connected to each other by the transverse shaft 20, the brake device operates whenever the clutch interlocking lever 17 rotates in the clockwise direction as viewed transversely from the left side toward the right. During this braking operation, the movement of the lever 17 is prevented from being transmitted to the yoke 13 by a slidable pin-and-slot joint comprising the aforementioned pin 16 at the distal end of the lever 17 and a longitudinal slot 30 formed in the link 15 and slidably engaged with the pin 16.

Since the equalizer 27 is freely swingable about the pin 31 as a pivotal point, it balances the braking forces applied to the left and right brakes even when a difference exists in wear of the left and right brake linings. That is, the equalizer 27 affords the simultaneous application of equal braking forces to the left and right brakes.

As described above with respect to a preferred embodiment thereof, this invention provides, in a vehicle of the type having left and right steering clutches and brakes, an operational control system whereby the actions of the steering clutches and brakes are interlocked, and, moreover, equal braking forces can be applied simultaneously to the left and right brakes by depressing a single pedal independently and irrespective of the engagement-release states of the steering clutches.

Accordingly, the difference in wear in the left and right brake linings can be minimized, and the frequency with which the steering levers and the brake pedal must be adjusted is substantially decreased.

I claim:

1. In a vehicle having left and right steering clutches and brakes, an operational control system comprising;
   left and right steering levers;
   left and right linkages respectively coupling the left steering lever to the left steering clutch and brake and the right steering lever to the right steering clutch and brake and actuated by the left and right steering levers to release, respectively, the left and right steering clutches and then to apply the corresponding brakes; each of said left and right linkages comprising;
   a bellcrank shaft (8) coupled via linkage (5,6,7) to and actuated by the respective steering lever (1 or 2);
   a first lever arm (9) fixed to and extending outward from the bellcrank shaft;
   a linkage (10,11,13) coupling the outer end of the first lever arm to the corresponding steering clutch;
   a second lever arm (12) fixed to and extending outward from the bellcrank shaft;
   a rotatable brake shaft (20);

a brake actuating lever (19) fixedly supported by the brake shaft and coupled via a linkage (18) to the corresponding brake;

a clutch interlocking lever (17) fixedly supported by the brake shaft; and link means (15) coupling the outer end of the second lever arm to the outer end of the clutch interlocking lever and including said means for effecting a specific delay and means permitting rotation of the clutch interlocking lever in its brake-application direction without reversely moving the second lever arm;

a brake pedal;

a third linkage coupling the brake pedal to transmission parts of the left and right linkages for applying respective brakes and actuated by the brake pedal to move said transmission parts in only brake applying action; said third linkage including;

an equalizer lever (27);

a linkage (24,25,26) coupling the brake pedal (3) to the midpoint of the equalizer lever; and left and right torque tubes (22,23) having fixed thereto lever arm coupled by links (34,33) respectively to the ends of the equalizer lever and having cutout coupling (29) for coupling with and rotating left and right clutch interlocking levers when the brake pedal is depressed, the cutout couplings functioning to accomplish only one-way transmission of torque from the torque tubes to their respective brakes; and means for effecting a specific delay between the release of each clutch and the subsequent application of the corresponding brake both due to actuation by the corresponding steering lever.

* * * * *